United States Patent
Huang et al.

(10) Patent No.: US 11,919,814 B2
(45) Date of Patent: Mar. 5, 2024

(54) METHOD FOR SIMULATING INTRAPLATE VOLCANISM

(71) Applicant: Wuhan University of Science and Technology, Hubei (CN)

(72) Inventors: Ao Huang, Hubei (CN); Yongshun Zou, Hubei (CN); Huazhi Gu, Hubei (CN)

(73) Assignee: Wuhan University of Science and Technology (CN)

( * ) Notice: Subject to any disclaimer, the term of this patent is extended or adjusted under 35 U.S.C. 154(b) by 783 days.

(21) Appl. No.: 17/097,708

(22) Filed: Nov. 13, 2020

(65) Prior Publication Data
US 2021/0183271 A1 Jun. 17, 2021

(30) Foreign Application Priority Data
Dec. 11, 2019 (CN) .......................... 201911265274.2

(51) Int. Cl.
*C04B 32/00* (2006.01)
(52) U.S. Cl.
CPC .................................. *C04B 32/005* (2013.01)
(58) Field of Classification Search
CPC .................................................... C04B 32/005

USPC ........................................................ 73/865.6
See application file for complete search history.

(56) References Cited

U.S. PATENT DOCUMENTS

| | | | | |
|---|---|---|---|---|
| 4,331,734 A | * | 5/1982 | Stegmeier | B44C 5/06 428/404 |
| 5,512,003 A | * | 4/1996 | Parker | A63H 13/16 124/79 |
| 6,481,128 B1 | * | 11/2002 | Lin | F21V 33/008 40/406 |

* cited by examiner

*Primary Examiner* — Eric S. McCall
(74) *Attorney, Agent, or Firm* — Kim IP Law Group LLC

(57) ABSTRACT

The disclosure relates to a method for simulating intraplate volcanism. A technical solution is: mixing 47-60 wt % of calcium oxide powder, 35 wt % of alumina powder and 5-18 wt % of silica powder uniformly to obtain a mixed powder; putting the mixed powder in a corundum crucible, placing the crucible in a high-temperature furnace provided with an observation window outside which an industrial camera with a depression angle of 30-45° is provided, heating to 1,500-1,900° C. at a rate of 1-30° C./min under an air atmosphere at a normal pressure, holding for 0.5-5 h; recording intraplate volcanism formed by upwelling of a melt of the mixed powder along an inner wall of the crucible during the holding with the industrial camera to obtain a simulated process of the intraplate volcanism.

6 Claims, 5 Drawing Sheets

METHOD FOR SIMULATING INTRAPLATE VOLCANISM

TECHNICAL FIELD

The disclosure belongs to the technical field of geological volcanism simulation, and specifically relates to a method for simulating intraplate volcanism.

BACKGROUND

Intraplate volcanism refers to the volcanic activity that occurs within tectonic plates, and formation mechanism thereof has always been one of research and discussion hotspots for geologists. Intraplate volcanoes are different from volcanoes at plate boundaries. They are located in areas with relatively stable geological conditions, which are completely different from those at mid-ocean ridges. Volcanic materials are products of melting part of upper mantle rocks, which is a generally accepted conclusion. However, there is still a lack of research on relationship between melting and shearing of upper mantle (asthenosphere) with direct evidence.

Most volcanism on the earth is at the plate boundaries and accompanied by subduction or rifting. Some relatively large volcanic areas have been observed at the plate boundaries and within the plate, and the materials originate from upwelling of a mantle plume in a deep mantle There is still volcanism far away from the plate boundaries, which is usually basaltic, overflowing and small in size, located inside a continent or generating volcanoes at the bottom of an ocean. The intraplate volcanism is usually attributed to various local processes, such as destruction of lithosphere, mantle convection in a small scale under the lithosphere, or shearing and melting of a low-viscosity body of asthenospheric mantle embedded in the bottom of the lithosphere. Intraplate volcanism of small-volume overflow cannot be caused by a plate boundary action or an upwelling mantle plume. Thus, it is difficult to explain this phenomenon with existing theories. The upwelling and melting of the asthenosphere caused by regional diffusion and extension is a prior tectonic explanation, but recent studies show that, lithosphere extension may actually hinder mantle melting. The intraplate volcanism is also believed to be related to some local underground activities, such as relatively small upwelling mantle plumes, downflow, and convection driven under the lithosphere or at the boundaries. These activities produce inconsistent local densities which result in rise of hot mantle materials, thereby leading to melting at a reduced pressure.

However, some mechanisms can associate global mantle flow and plate movement with melting under the lithosphere within the plate. For example, a rapidly shearing asthenosphere can enhance traction at the bottom of a tectonic plate, leading to rupture and other deformations caused by volcanism. Thus, if rheological properties thereof are non-Newtonian, rapid asthenospheric deformation can soften the upper lithosphere, leading to convective instability which causes surface volcanism. Finally, interacting with lithosphere or asthenosphere with an inconsistent viscosity, asthenospheric shearing can directly cause upwelling, that is, volcanism. For example, the asthenosphere gradually flowing toward a thinning lithosphere encounters upwelling materials which can cause melting. Since the asthenospheric shear tends to be intensified in a low-viscosity body embedded therein, the shear action of the asthenosphere with an inconsistent viscosity can promote sheared upwelling that causes volcanism. These mechanisms predict more volcanism above a rapidly shearing asthenosphere.

However, current mechanisms, processes and theoretical models of intraplate volcanism are basically studied and analyzed after actual occurrence of intraplate volcanism in the nature. Due to actual conditions or natural environment, it is impossible to visually observe a process of intraplate volcanism, and verify a proposed theoretical model or mechanism. Therefore, there has been diverging discussions of these models or mechanisms.

SUMMARY

The disclosure aims to overcome defects in the prior art, and is intended to provide a method for simulating intraplate volcanism at a low cost with high efficiency. The method can simulate intraplate volcanism more accurately, forming a basis for researches on the intraplate volcanism and meeting requirements of scientific popularization of the intraplate volcanism.

To achieve the above objective, the disclosure adopts the following technical solution:
   mixing 47-60 wt % of calcium oxide powder, 35 wt % of alumina powder and 5-18 wt % of silica powder uniformly to obtain a mixed powder;
   putting the mixed powder in a corundum crucible, placing the crucible in a high-temperature furnace provided with an observation window outside which an industrial camera with a depression angle of 30-45° is provided, heating to 1,500-1,900° C. at a rate of 1-30° C./min under an air atmosphere at a normal pressure, holding for 0.5-5 h;
   recording intraplate volcanism formed by upwelling of a melt of the mixed powder along an inner wall of the crucible during the holding with the industrial camera to obtain a simulated process of the intraplate volcanism.

The calcium oxide powder has ≥98 wt % of CaO and a particle size of ≤45 μm.

The alumina powder has ≥99 wt % of $Al_2O_3$ and a particle size of ≤45 μm.

The silica powder has ≥98 wt % of $SiO_2$ and a particle size of ≤45 μm.

The corundum crucible has a material with ≥90 wt % of $Al_2O_3$, an average pore diameter of ≤5 μm and a cylindrical shape.

A ratio of height of the inner wall of the corundum crucible to height of the mixed powder is 1:(0.2-0.6).

Based on the above technical solution, the disclosure has the following beneficial effects:
   (1) Calcium oxide powder, alumina powder and silica powder are mixed uniformly to obtain a mixed powder. The corundum crucible containing the mixed powder is placed in a high-temperature furnace provided with an observation window, and held at 1,500-1,900° C. for 0.5-5 h. Intraplate volcanism formed by upwelling of a melt of the mixed powder along an inner wall of the crucible during the holding is recorded with an industrial camera to obtain a simulated process of the intraplate volcanism. Thus, the cost is low, the efficiency is high and the simulation method is relatively accurate.
   (2) The mixed powder of calcium oxide, silica, and alumina in a suitable proportion forms a melt with a certain viscosity at a high temperature. Marangoni convection is produced at a three-phase interface of the melt, the inner wall of the corundum crucible and air to simulate the asthenosphere. The simulation method is relatively accurate.

(3) Due to erosion of the crucible wall at the three-phase interface of the melt, the inner wall of the corundum crucible and air, pits are formed on the inner wall of the corundum crucible and the melt can enter the pits. Thus, the inner wall of the corundum crucible above the convectively flowing melt simulates the lithosphere. Therefore, the simulation method is relatively accurate.

(4) The convectively flowing melt further reacts with the inner wall of the corundum crucible above the convectively flowing melt. The alumina in the corundum crucible is continuously dissolved into the melt, and forms a large amount of calcium hexaaluminate entering the melt based on the supersaturated precipitation theory. This results in a further increase of viscosity and density of the melt close to the inner wall of the corundum crucible above the convectively flowing melt. The differences of the viscosity and the density of the melts above and below the three-phase interface cause regularly sheared upwelling of the convectively flowing melt along the inner wall of the corundum crucible. This results in uniform and regular upwelling peaks, which objectively simulates the intraplate volcanism.

(5) The disclosure can simulate a process of intraplate volcanism under different geological conditions by changing a component of the mixed powder. The mixed powder melted at a high temperature forms a melt. An upwelling height of the melt is closely related to composition of the melt. At the same time, temperature holding time also directly affects a depth of the inner wall of the corundum crucible eroded by the upwelling melt. Therefore, intraplate volcanism under different conditions can be simulated by changing the component of the mixed powder and the temperature holding time. The process of intraplate volcanism can be analyzed by images of upwelling peaks taken. Specifically, formation mechanism of the intraplate volcanism can be analyzed based on formation process of the upwelling peaks, and factors affecting intensity of intraplate volcanism can be analyzed based on heights of the upwelling peaks. At the same time, the intensity and scope of the intraplate volcanism under different geological conditions can be predicted. The disclosure forms an important basis for researches on the intraplate volcanism and meets requirements of scientific popularization of the intraplate volcanism.

Therefore, the disclosure has features of low cost and high efficiency, and can simulate intraplate volcanism accurately, forming a basis for researches on the intraplate volcanism and meeting requirements of scientific popularization of the intraplate volcanism.

DETAILED DESCRIPTION

The disclosure will be further described below with reference to the accompanying drawings and specific examples which are not limiting the protection scope of the disclosure.

A method for simulating intraplate volcanism includes:
mixing 47-60 wt % of calcium oxide powder, 35 wt % of alumina powder and 5-18 wt % of silica powder uniformly to obtain a mixed powder;

putting the mixed powder in a corundum crucible, placing the crucible in a high-temperature furnace provided with an observation window outside which an industrial camera with a depression angle of 30-45° is provided, heating to 1,500-1,900° C. at a rate of 1-30° C./min under an air atmosphere at a normal pressure, holding for 0.5-5 h;

recording intraplate volcanism formed by upwelling of a melt of the mixed powder along an inner wall of the crucible during the holding with the industrial camera to obtain a simulated process of the intraplate volcanism.

Technical parameters involved in specific embodiments of the disclosure are universally described as follows, and are not to be repeated in examples:

The calcium oxide powder has ≥98 wt % of CaO and a particle size of ≤45 μm.

The alumina powder has ≥99 wt % of $Al_2O_3$ and a particle size of ≤45 μm.

The silica powder has ≥98 wt % of $SiO_2$ and a particle size of ≤45 μm.

The corundum crucible has a material with ≥90 wt % of $Al_2O_3$, an average pore diameter of ≤5 μm and a cylindrical shape.

Example 1

A method for simulating intraplate volcanism was provided. This Example adopted the following technical solution:

47 wt % of calcium oxide powder, 35 wt % of alumina powder and 18 wt % of silica powder were mixed uniformly to obtain a mixed powder.

The mixed powder was put in a corundum crucible. The crucible was placed in a high-temperature furnace provided with an observation window where an industrial camera with a depression angle of 30-45° was provided outside the observation window. Heating to 1,500° C. was carried out at a rate of 5° C./min under an air atmosphere at a normal pressure. The temperature was held for 0.5 h.

Intraplate volcanism formed by upwelling of a melt of the mixed powder along an inner wall of the crucible during temperature holding was recorded with the industrial camera to obtain a simulated process of the intraplate volcanism.

A ratio of height of the inner wall of the corundum crucible to height of the mixed powder was 1:0.2.

Figure 1:
FIG. 1 shows a cross section of a corundum crucible after a first simulation of the disclosure.

In this example, a cross section of the corundum crucible after simulation of the intraplate volcanism was shown in FIG. 1. It can be seen from FIG. 1 that, pits were formed at a three-phase interface of the melt formed by the mixed powder at a high temperature, the inner wall of the corundum crucible and air. At the same time, uniform and regular upwelling peaks were formed by upwelling of the melt along the inner wall of the corundum crucible. After measurement, a height difference between the top and the bottom of the upwelling peak was 2.1 mm.

Example 2

A method for simulating intraplate volcanism was provided. This Example adopted the following technical solution:

51.5 wt % of calcium oxide powder, 35 wt % of alumina powder and 13.5 wt % of silica powder were mixed uniformly to obtain a mixed powder.

The mixed powder was put in a corundum crucible. The crucible was placed in a high-temperature furnace provided with an observation window where an industrial camera with a depression angle of 30-45° was provided outside the observation window. Heating to 1,600° C. was carried out at a rate of 12° C./min under an air atmosphere at a normal pressure. The temperature was held for 1.5 h.

Intraplate volcanism formed by upwelling of a melt of the mixed powder along an inner wall of the crucible during temperature holding was recorded with the industrial camera to obtain a simulated process of the intraplate volcanism.

A ratio of height of the inner wall of the corundum crucible to height of the mixed powder was 1:0.3.

Figure 2:
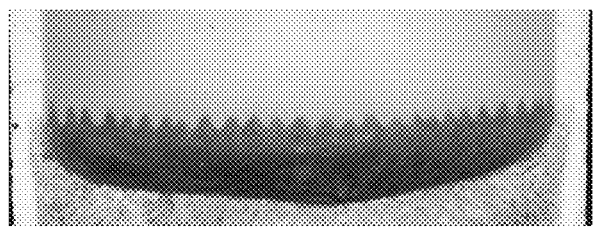
FIG. 2 shows a cross section of a corundum crucible after a second simulation of the disclosure.

In this example, a cross section of the corundum crucible after simulation of the intraplate volcanism was shown in FIG. 2. It can be seen from FIG. 2 that, pits were formed at a three-phase interface of the melt formed by the mixed powder at a high temperature, the inner wall of the corundum crucible and air. At the same time, uniform and regular upwelling peaks were formed by upwelling of the melt along the inner wall of the corundum crucible. After measurement, a height difference between the top and the bottom of the upwelling peak was 2.6 mm.

Example 3

A method for simulating intraplate volcanism was provided. This Example adopted the following technical solution:

54.5 wt % of calcium oxide powder, 35 wt % of alumina powder and 10.5 wt % of silica powder were mixed uniformly to obtain a mixed powder.

The mixed powder was put in a corundum crucible. The crucible was placed in a high-temperature furnace provided with an observation window where an industrial camera with a depression angle of 30-45° was provided outside the observation window. Heating to 1,700° C. was carried out at a rate of 18° C./min under an air atmosphere at a normal pressure. The temperature was held for 2.7 h.

Intraplate volcanism formed by upwelling of a melt of the mixed powder along an inner wall of the crucible during temperature holding was recorded with the industrial camera to obtain a simulated process of the intraplate volcanism.

A ratio of height of the inner wall of the corundum crucible to height of the mixed powder was 1:0.4.

Figure 3:
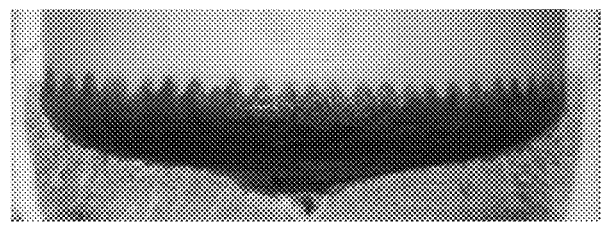
FIG. 3 shows a cross section of a corundum crucible after a third simulation of the disclosure.

In this example, a cross section of the corundum crucible after simulation of the intraplate volcanism was shown in FIG. 3. It can be seen from FIG. 3 that, pits were formed at a three-phase interface of the melt formed by the mixed powder at a high temperature, the inner wall of the corundum crucible and air. At the same time, uniform and regular upwelling peaks were formed by upwelling of the melt along the inner wall of the corundum crucible. After measurement, a height difference between the top and the bottom of the upwelling peak was 2.7 mm.

Example 4

A method for simulating intraplate volcanism was provided. This Example adopted the following technical solution:

57 wt % of calcium oxide powder, 35 wt % of alumina powder and 8 wt % of silica powder were mixed uniformly to obtain a mixed powder.

The mixed powder was put in a corundum crucible. The crucible was placed in a high-temperature furnace provided with an observation window where an industrial camera with a depression angle of 30-45° was provided outside the observation window. Heating to 1,800° C. was carried out at a rate of 24° C./min under an air atmosphere at a normal pressure. The temperature was held for 3.9 h.

Intraplate volcanism formed by upwelling of a melt of the mixed powder along an inner wall of the crucible during temperature holding was recorded with the industrial camera to obtain a simulated process of the intraplate volcanism.

A ratio of height of the inner wall of the corundum crucible to height of the mixed powder was 1:0.5.

Figure 4:
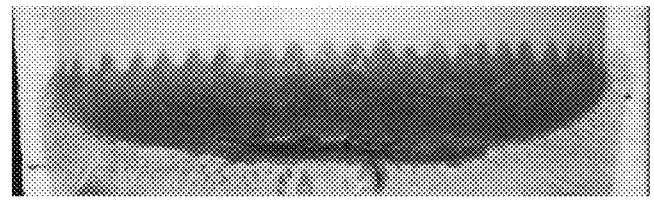
FIG. 4 shows a cross section of a corundum crucible after a fourth simulation of the disclosure.

In this example, a cross section of the corundum crucible after simulation of the intraplate volcanism was shown in FIG. 4. It can be seen from FIG. 4 that, pits were formed at a three-phase interface of the melt formed by the mixed powder at a high temperature, the inner wall of the corundum crucible and air. At the same time, uniform and regular upwelling peaks were formed by upwelling of the melt along the inner wall of the corundum crucible. After measurement, a height difference between the top and the bottom of the upwelling peak was 2.9 mm.

Example 5

A method for simulating intraplate volcanism was provided. This Example adopted the following technical solution:

60 wt % of calcium oxide powder, 35 wt % of alumina powder and 5 wt % of silica powder were mixed uniformly to obtain a mixed powder.

The mixed powder was put in a corundum crucible. The crucible was placed in a high-temperature furnace provided with an observation window where an industrial camera with a depression angle of 30-45° was provided outside the observation window. Heating to 1,900° C. was carried out at a rate of 30° C./min under an air atmosphere at a normal pressure. The temperature was held for 5 h.

Intraplate volcanism formed by upwelling of a melt of the mixed powder along an inner wall of the crucible during temperature holding was recorded with the industrial camera to obtain a simulated process of the intraplate volcanism.

A ratio of height of the inner wall of the corundum crucible to height of the mixed powder was 1:0.6.

Figure 5:
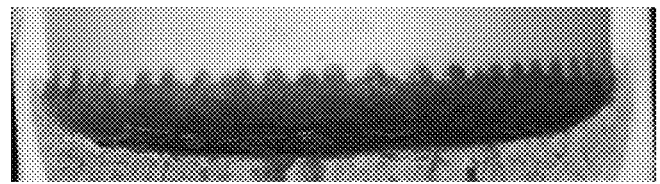
FIG. 5 shows a cross section of a corundum crucible after a fifth simulation of the disclosure.

In this example, a cross section of the corundum crucible after simulation of the intraplate volcanism was shown in FIG. 5. It can be seen from FIG. 5 that, pits were formed at a three-phase interface of the melt formed by the mixed powder at a high temperature, the inner wall of the corundum crucible and air. At the same time, uniform and regular upwelling peaks were formed by upwelling of the melt along the inner wall of the corundum crucible. After measurement, a height difference between the top and the bottom of the upwelling peak was 3.1 mm.

Compared with the prior art, specific embodiments of the disclosure had the following beneficial effects.

(1) Calcium oxide powder, alumina powder and silica powder were mixed uniformly to obtain a mixed powder. The corundum crucible containing the mixed powder was placed in a high-temperature furnace provided with an observation window, and held at 1,500-1,900° C. for 0.5-5 h. Intraplate volcanism formed by upwelling of the melt of the mixed powder along an inner wall of the crucible during the holding was recorded with an industrial camera to obtain a simulated process of the intraplate volcanism. Thus, the specific embodiments had a low cost and high efficiency.

(2) The mixed powder of calcium oxide, silica, and alumina in a suitable proportion formed a melt with a certain viscosity at a high temperature. Marangoni convection was produced at a three-phase interface of the melt, the inner wall of the corundum crucible and air to simulate the asthenosphere. The simulation method was relatively accurate.

(3) Due to erosion of the crucible wall at the three-phase interface of the melt, the inner wall of the corundum crucible and air, pits were formed on the inner wall of the corundum crucible and the melt can enter the pits. Thus, the inner wall of the corundum crucible above the convectively flowing melt simulated the lithosphere. Therefore, the simulation method was relatively accurate.

(4) The convectively flowing melt further reacted with the inner wall of the corundum crucible above the convectively flowing melt. The alumina in the corundum crucible was continuously dissolved into the melt, and formed a large amount of calcium hexaaluminate entering the melt based on the supersaturated precipitation theory. This resulted in a further increase of viscosity and density of the melt close to the inner wall of the corundum crucible above the convectively flowing melt. The differences of the viscosity and the density of the melts above and below the three-phase interface caused regularly sheared upwelling of the convectively flowing melt along the inner wall of the corundum crucible. This resulted in uniform and regular upwelling peaks, which objectively simulated the intraplate volcanism.

(5) The specific embodiments of the disclosure can simulate a process of intraplate volcanism under different geological conditions by changing a component of the mixed powder. The mixed powder melted at a high temperature formed a melt. An upwelling height of the melt was closely related to composition of the melt. At the same time, temperature holding time also directly affected a depth of the inner wall of the corundum crucible eroded by the upwelling melt. Therefore, intraplate volcanism under different conditions can be simulated by changing the component of the mixed powder and the temperature holding time. The process of intraplate volcanism can be analyzed by images of upwelling peaks taken. Specifically: formation mechanism of the intraplate volcanism can be analyzed based on formation process of the upwelling peaks, and factors affecting intensity of intraplate volcanism can be analyzed based on heights of the upwelling peaks. At the same time, the intensity and scope of the intraplate volcanism under different geological conditions can be predicted. The disclosure formed an important basis for researches on the intraplate volcanism and met requirements of scientific popularization of the intraplate volcanism.

Therefore, the specific embodiments of the disclosure had features of low cost and high efficiency, and can simulate intraplate volcanism accurately, forming a basis for researches on the intraplate volcanism and meeting requirements of scientific popularization of the intraplate volcanism.

What is claimed is:

1. A method for simulating intraplate volcanism, comprising: mixing 47-60 wt % of a calcium oxide powder, 35 wt % of an alumina powder and 5-18 wt % of a silica powder uniformly to obtain a mixed powder;
   putting the mixed powder in a corundum crucible, placing the crucible in a high-temperature furnace provided with an observation window outside which an industrial camera with a depression angle of 30-45° is provided, heating to 1,500-1,900° C. at a rate of 1-30° C./min under an air atmosphere at a normal pressure, and holding for 0.5-5 h;
   recording intraplate volcanism formed by upwelling of a melt of the mixed powder along an inner wall of the crucible during the holding with the industrial camera to obtain a simulated process of the intraplate volcanism.

2. The method for simulating intraplate volcanism according to claim 1, wherein the calcium oxide powder has ≥98 wt % of CaO and a particle size of ≤45 μm.

3. The method for simulating intraplate volcanism according to claim 1, wherein the alumina powder has ≥99 wt % of $Al_2O_3$ and a particle size of ≤45 μm.

4. The method for simulating intraplate volcanism according to claim 1, wherein the silica powder has ≥98 wt % of $SiO_2$ and a particle size of ≤45 μm.

5. The method for simulating intraplate volcanism according to claim 1, wherein the corundum crucible has a material with ≥90 wt % of $Al_2O_3$, an average pore diameter of ≤5 μm and a cylindrical shape.

6. The method for simulating intraplate volcanism according to claim 1, wherein a ratio of height of the inner wall of the corundum crucible to height of the mixed powder is 1:(0.2-0.6).

* * * * *